(12) United States Patent
Colin et al.

(10) Patent No.: US 12,065,124 B2
(45) Date of Patent: Aug. 20, 2024

(54) METHOD OF CONTROLLING A HYBRID POWERTRAIN OF A MOTOR VEHICLE

(71) Applicants: RENAULT S.A.S., Boulogne Billancourt (FR); UNIVERSITE D'ORLEANS, Orleans (FR)

(72) Inventors: Guillaume Colin, Olivet (FR); Souad Hadj-Said, Olivet (FR); Ahmed Ketfi-Cherif, Elancourt (FR)

(73) Assignees: RENAULT S.A.S., Boulogne Billancourt (FR); UNIVERSITE D'ORLEANS, Orleans (FR)

( * ) Notice: Subject to any disclaimer, the term of this patent is extended or adjusted under 35 U.S.C. 154(b) by 877 days.

(21) Appl. No.: 17/260,777

(22) PCT Filed: Jul. 9, 2019

(86) PCT No.: PCT/FR2019/051694
§ 371 (c)(1),
(2) Date: Jan. 15, 2021

(87) PCT Pub. No.: WO2020/016502
PCT Pub. Date: Jan. 23, 2020

(65) Prior Publication Data
US 2021/0291804 A1    Sep. 23, 2021

(30) Foreign Application Priority Data

Jul. 16, 2018  (FR) ........................................ 1856551

(51) Int. Cl.
*B60W 20/13*     (2016.01)
*B60W 10/06*     (2006.01)
(Continued)

(52) U.S. Cl.
CPC ............ *B60W 20/13* (2016.01); *B60W 10/06* (2013.01); *B60W 10/08* (2013.01); *B60W 10/26* (2013.01);
(Continued)

(58) Field of Classification Search
CPC ...... B60W 20/13; B60W 10/06; B60W 10/08; B60W 10/26; B60W 10/30; B60W 50/00;
(Continued)

(56) References Cited

U.S. PATENT DOCUMENTS

| 8,324,856 B2 | 12/2012 | Yamakawa et al. |
| 2014/0139156 A1* | 5/2014 | Hayashi ................. H02P 21/02 |
| | | 318/400.3 |

FOREIGN PATENT DOCUMENTS

| CN | 104002804 | 3/2016 |
| EP | 2 728 739 | 5/2014 |

(Continued)

OTHER PUBLICATIONS

Hadj-Said S, "Convex Optimization for Energy Management of Parallel Hybrid Electric Vehicles", 2016, JFAC—Papers Onljne, Elsevier B.V. Netherlands, vol. 49, No. 11, 2016, pp. 271-276, DOI: 10.1016/j.ifacol.2016.08.041, ISSN: 2405-8963, XP002788993 (Year: 2016).*

(Continued)

*Primary Examiner* — Peter D Nolan
*Assistant Examiner* — Ashley L Redhead, Jr.
(74) *Attorney, Agent, or Firm* — NIXON & VANDERHYE

(57) ABSTRACT

Disclosed is a method for controlling a hybrid vehicle power train, including a thermal drive chain and an electric drive chain, the electric drive chain including a traction battery, a voltage modulator, an inverter, first and second electrical (Continued)

machines. The voltage modulator is designed to modulate a supply voltage of an electric current from the traction battery to the first and second electrical machines. The method includes: a step of analytically calculating an optimal supply voltage using a mathematical expression that corresponds to the resolution of an equation expressed as $$\frac{\partial P_{bat}}{\partial U_e} = 0,$$

where $U_e$ is the supply voltage, $P_{bat}$ is the electrical power supplied by the traction battery, and where the electrical power supplied by the traction battery is expressed as a quadratic function of the supply voltage; and a step of controlling the voltage modulator in such a way that it outputs the optimal supply voltage.

20 Claims, 1 Drawing Sheet

(51) Int. Cl.
| | | |
|---|---|---|
| *B60W 10/08* | (2006.01) | |
| *B60W 10/26* | (2006.01) | |
| *B60W 10/30* | (2006.01) | |
| *B60W 50/00* | (2006.01) | |

(52) U.S. Cl.
CPC ............ *B60W 10/30* (2013.01); *B60W 50/00* (2013.01); *B60W 2050/0013* (2013.01); *B60W 2050/0019* (2013.01); *B60W 2510/083* (2013.01); *B60W 2710/242* (2013.01)

(58) Field of Classification Search
CPC . B60W 2050/0013; B60W 2050/0019; B60W 2510/083; B60W 2710/242; B60W 2050/0008; B60W 2050/0027; B60W 2050/0037; B60W 2510/081; B60W 2710/083; B60W 20/11; Y02T 10/40; Y02T 10/70; Y02T 10/72; Y02T 10/62; B60Y 2200/92; Y04S 10/126
See application file for complete search history.

(56) References Cited

FOREIGN PATENT DOCUMENTS

| | | |
|---|---|---|
| JP | 2014-136560 A | 7/2014 |
| JP | 2017-163643 A | 9/2017 |
| WO | 2013/001634 A1 | 1/2013 |

OTHER PUBLICATIONS

International Search Report for PCT/FR2019/051694 dated Dec. 19, 2019, 7 pages.
Written Opinion of the ISA for PCT/FR2019/051694 dated Dec. 19, 2019, 6 pages.
Hadj-Said et al., "Convex Optimization for Energy Management of Parallel Hybrid Electric Vehicles", IFAC—PapersOnLine, 2016, vol. 29, No. 11, pp. 271-276 (6 total pages).
Nguyen et al., "An Optimal Control-Based Strategy for Energy Management of Electric Vehicles Using Battery/Supercapacitor", 2017 IEEE Vehicle Power and Propulsion Conference (VPPC), IEEE, Dec. 11, 2017, pp. 1-6 (6 total pages).

* cited by examiner

METHOD OF CONTROLLING A HYBRID POWERTRAIN OF A MOTOR VEHICLE

CROSS-REFERENCE TO RELATED APPLICATIONS

This application is the U.S. national phase of International Application No. PCT/FR2019/051694 filed Jul. 9, 2019 which designated the U.S. and claims priority to FR 1856551 filed Jul. 16, 2018, the entire contents of each of which are hereby incorporated by reference.

BACKGROUND OF THE INVENTION

Field of the Invention

The present invention relates generally to motor vehicles equipped with hybrid powertrains, and in particular those equipped with powertrains including several electrical machines and an internal combustion engine.

It relates more particularly to a method for controlling a hybrid powertrain of a motor vehicle, said powertrain comprising a thermal drive chain and an electric drive chain, said electric drive chain comprising a traction battery, a voltage modulation device, an inverter, a first electrical machine and a second electrical machine, the voltage modulation device being adapted to modulate a supply voltage of an electric current which is output by the traction battery and which is supplied to the first electrical machine and the second electrical machine of the motor vehicle.

Description of the Related Art

A hybrid motor vehicle includes a conventional thermal drive chain (with an internal combustion engine, a fuel tank, and a gearbox) and an electric drive chain (with a traction battery, a voltage booster, an inverter and one or more electrical machines).

When it comes to parallel hybridization, such a motor vehicle is capable of being towed by its sole electric drive chain, or by its sole thermal drive chain, or else simultaneously by its two electric and thermal drive chains.

Attempt is always made to minimize the consumption of electric current and fuel of the two powertrains in order to best reduce the release of polluting components into the atmosphere and to guarantee the best possible range to the vehicle.

To achieve this purpose, one solution is to find the optimal supply voltage for the inverter, namely, that which minimizes electrical losses in the electric drive chain.

For this purpose, a method is known from document U.S. Pat. No. 8,324,856 consisting in determining this optimal supply voltage by means of a map which associates, with each torque and speed of the electrical machines, a voltage value.

However, reading the map to determine the optimal supply voltage is a long and complex step to implement in real traffic conditions of a motor vehicle. This step is particularly complex when there are several electrical machines present because the map to be developed includes more than two dimensions.

SUMMARY OF THE INVENTION

In order to overcome the aforementioned drawbacks of the prior art, the present invention proposes to calculate the optimal supply voltage analytically.

More particularly, according to the invention, it is provided a method for controlling a hybrid powertrain of a motor vehicle as defined in the introduction and which includes:

a step of analytically calculating an optimal supply voltage by means of a mathematical expression which corresponds to the resolution of an equation expressed in the form $$\frac{\partial P_{bat}}{\partial U_e} = 0,$$

wherein $U_e$ is the supply voltage, wherein $P_{bat}$ is the electrical power supplied by the traction battery and wherein said electrical power supplied by the traction battery is expressed in the form of a quadratic function of said supply voltage, and a step of controlling the voltage modulation device so that it supplies said optimal supply voltage.

Thus, thanks to the invention, an analytical model is used in order to synthesize a precise value of the optimal supply voltage.

The use of such an analytical model is interesting here for two major reasons, namely the reliability of the results it gives and the ease of its implementation on different categories of hybrid motor vehicles.

Other advantages of the proposed solution are as follows. This method requires very low computing power. It ensures continuity in the control of the voltage modulation device (so as to avoid any degradation of the electrical powertrain and suddenly uncomfortable for the passengers of the vehicle). It allows to enjoy the full performance of the motor vehicle in any driving situation.

Other non-limiting and advantageous features of the method for controlling a hybrid powertrain of a motor vehicle according to the invention, taken individually or in any technically possible combination, are as follows:

the mathematical expression of said optimal supply voltage is given by the formula $$\frac{-K_1}{2.K_2}$$

if said optimal supply voltage is comprised between the voltage at the terminals of the traction battery and a predetermined maximum voltage threshold, wherein $K_1$ and $K_2$ are predetermined functions depending on a first speed of the first electrical machine, on a second speed of the second electrical machine, on the first electric torque developed by the first electrical machine and on the second electric torque developed by the second electrical machine;

which the mathematical expression of said optimal supply voltage is selected equal to the voltage at the terminals of the traction battery if the expression $$\frac{-K_1}{2.K_2}$$

is lower than said voltage at the terminals of the traction battery;

the mathematical expression of said optimal supply voltage is selected equal to the maximum voltage threshold if the expression $$\frac{-K_1}{2.K_2}$$

is greater than said maximum voltage threshold;

the power supplied by the traction battery is expressed according to the formula: $P_{bat}=K_2U_e^2+K_1U_e+K_0$, where $U_e$ is the supply voltage and $K_0$, $K_1$ and $K_2$ are predetermined functions depending on the first speed of the first electrical machine, the second speed of the second electrical machine, the first electric torque developed by the first electrical machine and the second electric torque developed by the second electrical machine;

it is also provided, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the motor vehicle and of an equivalence factor associated with the traction battery;

said first optimal electric torque, said second optimal electric torque and said optimal electric voltage minimize the electrical losses in an assembly comprising at least the voltage modulation device if a Hamiltonian, which is a function of the fuel consumption of an internal combustion engine of the motor vehicle and of an electric current consumption of said assembly, is minimized;

it is also provided, before the step of analytically calculating the optimal supply voltage, a step of determining the electrical power supplied by the traction battery; and the electrical losses in the voltage modulation device are expressed in the form of a linear function of said supply voltage.

BRIEF DESCRIPTION OF THE DRAWINGS

The description which will follow with regard to the appended drawings, given by way of non-limiting examples, will make it clear what the invention consists of and how it can be carried out.

In the appended drawings.

DESCRIPTION OF THE PREFERRED EMBODIMENTS

Conventionally, a motor vehicle includes a chassis which in particular supports a powertrain, bodywork elements and passenger compartment elements.

Figure 1:
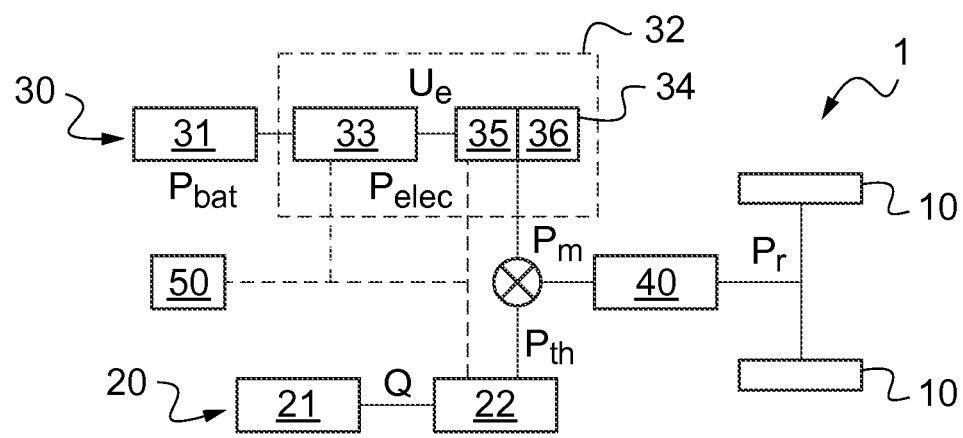
FIG. 1 is a schematic figure of the drive chains of a hybrid motor vehicle.

As shown in FIG. 1, in a hybrid-type motor vehicle 1, the hybrid powertrain includes a thermal drive chain 20 and an electric drive chain 30.

The thermal power train 20 includes in particular a fuel tank 21 and an internal combustion engine 22 which is supplied with fuel by the tank and whose output shaft is coupled to the drive wheels 10 of the motor vehicle.

The electric drive chain 30 in turn includes a traction battery 31, a voltage modulation device 33, an inverter 35 and two (or, alternatively, more than two) electrical machines: a first electrical machine 36a and a second electrical machine 36b. It will be considered here that the first electrical machine 36a and the second electrical machine 36b are not identical.

The voltage modulation device 33 is here a voltage booster connected, at the input, to the traction battery 31, and, at the output, to the inverter 35.

The inverter 35 is designed to generate an alternating current from the direct current received from the voltage modulation device 33.

The first electrical machine 36a and the second electrical machine 36b are here electric motors, the output shafts of which are coupled to the drive wheels 10 of the motor vehicle 1.

The inverter 35, the first electrical machine 36a and the second electrical machine 36b are here combined into a single apparatus 34.

The voltage modulation device 33, the inverter 35, the first electrical machine 36a and the second electrical machine 36b are here defined as a "current consuming assembly 32".

The two drive chains 20, 30 are joined together to allow the drive wheels 10 of the motor vehicle 1 to be rotated, via a transmission device 40.

The motor vehicle 1 also comprises an electronic control unit (or ECU), here called calculator 50, allowing to control the two aforementioned drive chains (in particular the voltage developed by the voltage modulation device 33 and the powers developed by the first electrical machine 36a, by the second electrical machine 36b and by the internal combustion engine 22).

The calculator 50 comprises a processor and a memory which records data used in the context of the method described below.

This memory also stores a computer application, consisting of computer programs comprising instructions, the execution of which by the processor allows the implementation by the calculator 50 of the method described below.

For the implementation of the invention, the calculator 50 is connected to sensors.

It is in particular connected to sensors adapted to measure the speeds of rotation, that is to say the speeds, of the internal combustion engine 22, of the first electrical machine 36a and the second electrical machine 36b.

It is also connected to a sensor allowing to determine how far the vehicle should accelerate or decelerate. It can be a sensor measuring the position of the accelerator pedal of the vehicle, or a sensor measuring the speed of the vehicle (in the case where the vehicle must follow a speed setpoint imposed by the driver).

The calculator 50 is thus able to determine the value of a datum relating to an energy required by the driver of the vehicle to move this vehicle forward with the desired dynamics. It will be considered here that the calculator 50 determines more precisely the value of a power that the drive wheels 10 must receive, hereinafter called "power to the wheels $P_r$".

Here, other concepts allowing a good understanding of the invention can be defined.

The value of the electrical power supplied by the traction battery 31 to the voltage modulation device 33 will here be called "battery power $P_{bat}$".

The value of the electrical power supplied by the voltage modulation device 33 to the inverter 35 will here be called "electrical power supply $P_{elec}$". It is decomposed into a first electrical power supply $P_{elec1}$ of the first electrical machine 36a and a second electrical power supply $P_{elec2}$ of the second electrical machine 36b according to the mathematical formula: $P_{elec} = P_{elec1} + P_{elec2}$.

The value of the voltage of the electric current outputted by the voltage modulation device 33 will be called "supply voltage $U_e$".

The value of the power supplied by the first electrical machine 36a to the drive wheels 10 will here be called "first electromechanical power $P_{m1}$". The value of the power supplied by the second electrical machine 36b to the drive wheels 10 will here be called "second electromechanical power $P_{m2}$". The value of the total power supplied by the two electrical machines to the drive wheels 10 is called "electromechanical power $P_m$", which can be expressed by the mathematical formula: $P_m = P_{m1} + P_{m2}$.

The value of the power supplied by the internal combustion engine 22 alone to the drive wheels 10 will here be called "thermomechanical power $P_{th}$".

The fuel consumption of the internal combustion engine 22 will be referred to as "fuel flow Q".

The "energy cost" of the electrical energy stored in the traction battery 31, with regard to the cost of thermal energy will be called "equivalence factor $\lambda$ of the traction battery 31". Its value will be selected depending on what is preferred rather the first electrical machine 36a and the second electrical machine 36b or the internal combustion engine 22 to propel the motor vehicle 1. This equivalence factor is expressed in g/Wh.

The object of the invention is to determine the contribution that the first electrical machine 36a, the second electrical machine 36b and the internal combustion engine 22 must each make to meet the demand for power to the wheels $P_r$ required by the driver, while at the same time guaranteeing minimum electrical losses in the current consuming assembly 32. The purpose is then, more specifically, to find the optimal supply voltage value $U_e^{opt}$ supplied by the voltage modulation device 33 to the inverter 35 allowing to guarantee this reduction in electrical losses.

Otherwise formulated, the object of the method which will be described below will be to find, as a function of the value of the required power to the wheels $P_r$, of the speed $\omega_{th}$ of the internal combustion engine 22, of a first speed $\omega_{e1}$ of the first electrical machine 36a and of a second speed $\omega_{e2}$ of the second electrical machine 36b, the triplet $\{U_e^{opt}, P_{th}^{opt}, P_m^{opt}\}$ which guarantees these minimum electrical losses (the exponent "opt" meaning that it is the optimal value).

To ensure a good understanding of the invention, the method allowing the calculator 50 on board the motor vehicle 1 to lead to the calculation of the triplet $\{U_e^{opt}, P_{th}^{opt}, P_m^{opt}\}$ will be well detailed in a first part of the description.

The reasoning that led to the invention can be detailed in a second part of this description.

In the first part, the method that will be implemented by the calculator 50 when the motor vehicle 1 is started, can therefore be described.

This method includes different steps described below and shown in FIG. 2. These steps will be implemented recursively, that is to say in a loop and at regular time pitches.

Figure 2:
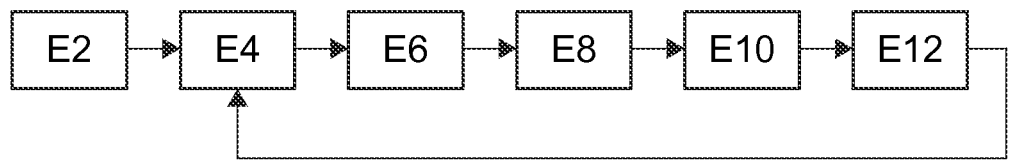
FIG. 2 shows in the form of a flowchart a method in accordance with the invention.

As visible in FIG. 2, the method begins with a first step E2. During this step, the calculator 50 acquires the power required to the wheels $P_r$, taking into account for example the position of the accelerator pedal of the motor vehicle.

It also acquires the first speed $\omega_{e1}$ of the first electrical machine 36a, the second speed $\omega_{e2}$ of the second electrical machine 36b and the speed $\omega_{th}$ of the internal combustion engine 22, for example by means of angular speed sensors.

It also reads the value of the equivalence factor $\lambda$ of the traction battery 31 in its memory. This value is predetermined (which means that it is invariable from one-time pitch to another).

The method continues at step E4. In this step, the calculator 50 calculates a first optimal electric torque $T_{e1}^{opt}$ that the first electrical machine 36a must develop and a second optimal electric torque $T_{e2}^{opt}$ that the second electrical machine 36b must develop so as to meet the needs of the driver, taking into account mainly the power required to the wheels $P_r$ and the equivalence factor $\lambda$ (which it will be recalled that it is decisive for calculating the contribution of each drive chain 20, 30 to move the vehicle forward).

For this purpose, the calculator 50 first determines the optimal electromechanical power $P_m^{opt}$. In particular, the calculator 50 determines this power analytically from the first electrical power supply $P_{elec1}$ of the first electrical machine 36a and from the second electrical power supply $P_{elec2}$ of the second electrical machine 36b, according to an approach which will be detailed below.

The two values of the first optimal electric torque $T_{e1}^{opt}$ and of the second optimal electric torque $T_{e2}^{opt}$ are then transmitted respectively to the first electrical machine 36a and to the second electrical machine 36b in the form of a setpoint in step E6. Making this instruction is not instantaneous (the two electrical machines having a response time of the order of ten milliseconds), in practice, at this moment, the first electrical machine 36a and the second electrical machine 36b develop respectively a first current electric torque $T_{e1}^c$ and a second current electric torque $T_{e2}^c$.

During step E8, the calculator 50 then estimates the electrical losses in the current consuming assembly 32 by taking into account the first current electric torque $T_{e1}^c$ and the second current electric torque $T_{e2}^c$, as well as the first speed $\omega_{e1}$ of the first electrical machine 36a and the second speed $\omega_{e2}$ of the second electrical machine 36b.

Then this value of the electrical losses is used by the calculator 50 in step E10 in order to analytically calculate the optimal supply voltage $U_e^{opt}$ that the voltage modulation device 33 must provide so as to minimize these losses in the current consuming assembly 32.

For this purpose, the calculator 50 calculates an intermediate voltage of the form $-K_1/2 \cdot K_2$, wherein $K_1$ and $K_2$ are predetermined functions. These predetermined functions depend on the first speed $\omega_{e1}$ of the first electrical machine 36a, on the second speed $\omega_{e2}$ of the second electrical machine 36b, on the first electric torque $T_{e1}$ developed by the first electrical machine 36a and on the second electric torque $T_{e2}$ developed by the second electrical machine 36b. They depend in particular on the first current electric torque $T_{e1}^c$ of the first electrical machine 36a and on the second current electric torque $T_{e2}^c$ of the second electrical machine 36b. In practice, these functions $K_1$ and $K_2$ are determined upstream based on experimental results. The functions $K_1$ and $K_2$ are then stored in the memory of the calculator 50.

If this intermediate voltage $$\frac{-K_1}{2 \cdot K_2}$$

is comprised between the voltage $U_{bat}$ at the terminals of the traction battery 31 and a maximum voltage threshold $U_e^{max}$, the optimal supply voltage $U_e^{opt}$ is considered equal to this intermediate voltage $$\frac{-K_1}{2.K_2}.$$

This voltage threshold $U_e^{max}$ is predetermined on test benches and is for example recorded in the memory of the calculator 50. In practice here, this is the maximum voltage value that the current consuming assembly 32 (and in particular the inverter 35) can support.

On the other hand, if the intermediate voltage $$\frac{-K_1}{2.K_2}$$

is lower than the voltage $U_{bat}$ at the terminals of the traction battery 31, the optimal supply voltage $U_e^{opt}$ is considered equal to the voltage $U_{bat}$ at the terminals of the traction battery 31.

Finally, if the intermediate voltage $$\frac{-K_1}{2.K_2}$$

is greater than the maximum voltage threshold $U_e^{max}$, the optimal supply voltage $U_e^{opt}$ is considered equal to this maximum voltage threshold $U_e^{max}$.

In summary, the optimal supply voltage is given by:

$$U_e^{opt} = \begin{cases} U_{bat}, & \text{if } \frac{-K_1}{2 \cdot K_2} < U_{bat} \\ \frac{-K_1}{2 \cdot K_2}, & \text{if } U_{bat} < \frac{-K}{2 \cdot K_2} < U_e^{max} \\ U_e^{max}, & \text{if } U_e^{max} < \frac{-K_1}{2 \cdot K_2} \end{cases}$$

The setpoint on the optimal supply voltage value $U_e^{opt}$ is transmitted, in step E12, to the voltage modulation device 33. However, this setpoint is not made instantaneously, the voltage modulation device 33 having a response time of the order of ten milliseconds. In practice, at this moment, the voltage modulation device 33 then supplies a supply voltage called current supply voltage $U_e^c$.

This current supply voltage value $U_e^c$ is then reused by the calculator 50 in order to estimate a new first optimal electric torque $T_{e1}^{opt}$ that the first electrical machine 36a must develop and a new second optimal electric torque $T_{e2}^{opt}$ that the second electrical machine 36b must develop in such a way as to meet the needs of the driver, taking into account mainly the power required to the wheels $P_r$, the equivalence factor $\lambda$ and the current supply voltage $U_e^c$ (return to step E4).

The steps are repeated so as to converge the current values of the supply voltage, of the first electric torque and of the second electric torque towards their optimal values, thus allowing minimizing the electrical losses.

In practice, at each loop, the values of the parameters are re-evaluated according to the current values, then readjusting the various optimal values. The control is then carried out so as to make these values converge towards those minimizing the electrical losses.

Finally, the control method in accordance with the invention ends with a step of controlling the voltage modulation device 33 so that it supplies the optimal supply voltage $U_e^{opt}$.

The reasoning that led to the method described above can now be described in a second part of this description.

The method used is based on the principle of the Pontriaguine's minimum. This principle applies to a particular mathematical operator, namely a Hamiltonian.

This Hamiltonian is defined here as a function, on the one hand, of the fuel flow Q, and, on the other hand, of the product of the consumed electrical power $P_{bat}$ (supplied by the traction battery 31) and of the equivalence factor $\lambda$. It is expressed in the following form: $H_{hyb}=Q+\lambda \cdot P_{bat}$.

According to the principle of Pontriaguine's minimum, this Hamiltonian must be minimized in order to find the optimal values sought.

The optimization process corresponding to the method described above can be decomposed into two main parts.

The first part consists in optimizing the supply voltage $U_e$. Using the Hamiltonian defined above, the optimal supply voltage $U_e^{opt}$ is therefore the solution of the equation: $U_e^{opt}=\arg$ $$U_e^{opt} = \arg\min_{U_e} H_{hyb}.$$

This equation is also written, by the definition of Hamiltonian:

$$U_e^{opt} = \arg\min_{U_e} P_{bat}.$$

$P_{bat}$. Finally, the optimal supply voltage $U_e^{opt}$ is obtained by means of a mathematical expression which corresponds to the solution of an equation expressed in the form $$\frac{\partial P_{bat}}{\partial U_e} = 0.$$

By definition, the electrical power $P_{bat}$ supplied by the traction battery 31 is decomposed into the electrical power supply $P_{elec}$ and the power linked to the electrical losses $P_S$: $P_{bat}=P_{elec}+P_S$.

In general, analytically solving the equation $$\frac{\partial P_{bat}}{\partial U_e} = 0$$

is complex. The method used here consisted in using an approximation for the electrical power $P_{bat}$ supplied by the traction battery 31.

According to this approximation, a modelled electrical power $P_{bat}^{app}$ is described as a function of the electrical power supply $P_{elec}$ and a modeled power related to the electrical losses $P_S^{app}$: $P_{bat}^{app}=P_{elec}+P_S^{app}$.

Using experimental results, the Applicant has observed that, in a good approximation, the modeled power $P_S^{app}$ linked to the electrical losses of the voltage booster is expressed in the form of a linear function of the supply voltage $U_e$.

According to this model, this power is then written: $P_S^{app}=\beta_1 U_e+\beta_0$ where $U_e$ is the supply voltage and $\beta_0$ and $\beta_1$ are predetermined functions depending on the first speed $\omega_{e1}$ of the first electrical machine 36a, on the second speed $\omega_{e2}$ of the second electrical machine 36b, on the first electric torque $T_{e1}$ of the first electrical machine 36a and on the second electric torque $T_{e2}$ of the second electrical machine 36b.

Within the framework of this approximation, solving the equation $$\frac{\partial P_{bat}}{\partial U_e}=0$$

then amounts to solving the equation $$\frac{\partial P_{bat}^{app}}{\partial U_e}=0.$$

Using experimental results, the Applicant has also found that, as a good approximation, the modeled electrical power $P_{bat}^{app}$ supplied by the traction battery 31 is expressed as a quadratic function of the supply voltage $U_e$.

In practice, it is given by the following formula:
$P_{bat}^{app}=K_2 U_e^2+K_1 U_e+K_0$, where $U_e$ is the supply voltage and $K_0$, $K_1$ and $K_2$ are predetermined functions depending on the first speed $\omega_{e1}$ of the first electrical machine 36a, on the second speed $\omega_{e2}$ of the second electrical machine 36b, on the first electric torque $T_{e1}$ developed by the first electrical machine 36a and on the second electric torque $T_{e2}$ developed by the second electrical machine 36b. In practice, the functions $K_0$, $K_1$ and $K_2$ result from the best quadratic adjustment of the experimental results.

Finally, using the quadratic form for the expression of the modeled electrical power $P_{bat}^{app}$ supplied by the traction battery 31, the solution of the equation $$\frac{\partial P_{bat}^{app}}{\partial U_e}=0$$

is written in the form:

$$U_e^*=\frac{-K_1}{2\cdot K_2},$$

with $U_e^*$ the intermediate voltage previously introduced and $K_1$ and $K_2$ the predetermined functions of the modeled electrical power $P_{bat}^{app}$ supplied by the traction battery 31.

This solution is optimal when it corresponds to a minimum for the modeled electrical power $P_{bat}^{app}$ supplied by the traction battery 31. This means that the modeled electrical power $P_{bat}^{app}$ supplied by the traction battery 31 is a convex function relative to the supply voltage $U_e$. Then, this implies that the predetermined function $K_2$ is positive.

The determination of the optimal supply voltage $U_e^{opt}$ must also satisfy a validity constraint. This constraint is written in the form: $U_{bat} \le U_e^{opt} \le U_e^{max}$ with $U_{bat}$ the voltage at the terminals of the traction battery 31 and $U_e^{max}$ the maximum voltage threshold. Finally, as described above, the optimization of the supply voltage occurs in the following different cases:

$$U_e^{opt}=\begin{cases} U_{bat}, \text{ if } \frac{-K_1}{2\cdot K_2} < U_{bat} \\ \frac{-K_1}{2\cdot K_2}, \text{ if } U_{bat} < \frac{-K}{2\cdot K_2} < U_e^{max} \\ U_e^{max}, \text{ if } U_e^{max} < \frac{-K_1}{2\cdot K_2} \end{cases}$$

A second part of the optimization process consists in optimizing the distribution of electric torques between the first electrical machine 36a and the second electrical machine 36b.

Knowing that the electric torques $T_{e1}$ and $T_{e2}$ are related to the electromechanical powers by the equations $P_{m1}=T_{e1}\times\omega_{e1}$ and $P_{m2}=T_{e2}\times\omega_{e2}$, the optimization of the electric torques is equivalent to the optimization of the electromechanical powers $P_{m1}$ and $P_{m2}$.

This optimization consists first of all in a "local" optimization between the first electrical machine 36a and the second electrical machine 36b. First of all, the optimal distribution of electrical power between the first electrical machine 36a and the second electrical machine 36b is to be determined.

For this purpose, it is known to model, respectively, the first electrical power supply $P_{elec1}$ of the first electrical machine 36a and a second electrical power supply $P_{elec2}$ of the second electrical machine 36b, according to a quadratic function of the first electromechanical power $P_{m1}$ and the second electromechanical power $P_{m2}$. In other words, the first electrical power supply $P_{elec1}$ of the first electrical machine 36a and the second electrical power supply $P_{elec2}$ of the second electrical machine 36b are expressed according to the following formulas: $P_{elec1}=a_1 P_{m1}^2+b_1 P_{m1}+c_1$ and $P_{elec2}=a_2 P_{m2}^2+b_2 P_{m2}+c_2$, with $P_{m1}$ the first electromechanical power, $P_{m2}$ the second electromechanical power, $a_1$, $b_1$, $c_1$, $a_2$, $b_2$, and $c_2$ are predetermined parameters.

By introducing these two equalities in the definition of the electrical power supply $P_{elec}$ and also using the definition of the electromechanical power $P_m=P_{m1}+P_{m2}$, it is possible to express the electrical power supply $P_{elec}$ only as a function of the electromechanical power $P_m$ and the first electromechanical power $P_{m1}$.

The optimization of the electrical power supply $P_{elec}$ then results in the determination of the first optimal electromechanical power $P_{m1}^{opt}$ as a function of the electromechanical power $P_m$ by the following formula:
$P_{m1}^{opt}=\arg$ $$P_{m1}^{opt}=\underset{P_{m1}}{\arg\min} P_{elec}(P_m, P_{m1}),$$

or else $$\frac{\partial P_{elec}}{\partial P_{m1}}=0.$$

Alternatively, it is possible to express the electrical power supply $P_{elec}$ only as a function of the electromechanical power $P_m$ and the second electromechanical power $P_{m2}$. The optimization of the electrical power supply $P_{elec}$ can then be carried out by determining the second optimal electromechanical power $P_{m2}^{opt}$.

The optimization of the electric torques continues with a "global" optimization aiming at determining the optimal distribution of power between the two electrical machines 36a, 36b, on the one hand, and the heat engine, on the other hand.

As presented previously, it is sought to minimize the Hamiltonian, which depends, among others, on the modeled electrical power $P_{bat}^{app}$.

However, by using the first determined electromechanical power $P_{m1}^{opt}$, it is possible to express the modeled electrical power $P_{bat}^{app}$ supplied by the traction battery 31 as a function of the electromechanical power $P_m$ according to the formula: $P_{bat}^{app}=a_2 P_m^2+a_1 P_m+a_0$, with $a_0$, $a_1$, $a_2$ parameters depending on the predetermined parameters $a_1$, $b_1$, $c_1$, $a_2$, $b_2$, and $c_2$.

The Hamiltonian minimization allows to deduce the optimal electromechanical power $P_m^{opt}$ from the equation:

$$P_m^{opt} = \operatorname*{argmin}_{P_m} H_{hyb}$$

which is also written $$\frac{\partial H_{hyb}}{\partial P_m} = 0.$$

Finally, the knowledge of $P_m^{opt}$ and $P_{m1}^{opt}$ (or alternatively of $P_m^{opt}$ and $P_{m2}^{opt}$) allows to deduce $P_{m2}^{opt}$ (or alternatively $P_{m1}^{opt}$). The optimal electric torques are then deduced from the equations $P_{m1}^{opt}=T_{e1}^{opt}\times\omega_{e1}$ and $P_{m2}^{opt}=T_{e2}^{opt}\times\omega_{e2}$.

The invention claimed is:

1. A method of controlling drive chains for a hybrid electric vehicle comprising an internal combustion engine and a motor, said drive chains including a thermal drive chain and an electric drive chain, said electric drive chain comprising a traction battery, a voltage modulation device, an inverter, a first electrical machine and a second electrical machine, the voltage modulation device being adapted to modulate a supply voltage of an electric current which is output by the traction battery and which is supplied to the first electrical machine and to the second electrical machine of the hybrid electric vehicle, the method comprising:
a step of analytically calculating an optimal supply voltage by means of a mathematical expression which corresponds to the resolution of an equation expressed in the form $$\frac{\partial P_{bat}}{\partial U_e} = 0,$$

wherein $U_e$ is the supply voltage, wherein $P_{bat}$ is the electrical power supplied by the traction battery and wherein said electrical power supplied by the traction battery is expressed in the form of a quadratic function of said supply voltage, and
a step of controlling the voltage modulation device so that the voltage modulation device supplies said optimal supply voltage.

2. The control method according to claim 1, wherein the mathematical expression of said optimal supply voltage is given by the formula $$\frac{-K_2}{2\cdot K_2}$$

if said optimal supply voltage is comprised between the voltage at the terminals of the traction battery and a predetermined maximum voltage threshold, wherein $K_1$ and $K_2$ are predetermined functions depending on a first speed of the first electrical machine, of a second speed of the second electrical machine, on the first electric torque developed by the first electrical machine and on the second electric torque developed by the second electrical machine.

3. The control method according to claim 2, wherein the mathematical expression of said optimal supply voltage is selected equal to the voltage at the terminals of the traction battery if the expression $$\frac{-K_2}{2\cdot K_2}$$

is lower than said voltage at the terminals of the traction battery.

4. The control method according to claim 3, wherein the mathematical expression of said optimal supply voltage is selected equal to the maximum voltage threshold if the expression $$\frac{-K_2}{2\cdot K_2}$$

is greater than said maximum voltage threshold.

5. The control method according to claim 3, wherein the power supplied by the traction battery is expressed according to the formula: $P_{bat}=K_2 U_e^2+K_1 U_e+K_0$, where $U_e$ is the supply voltage and $K_0$, $K_1$ and $K_2$ are predetermined functions depending on the first speed of the first electrical machine, on the second speed of the second electrical machine, on the first electric torque developed by the first electrical machine and on the second electric torque developed by the second electrical machine.

6. The control method according to claim 3, also comprising, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the hybrid electric vehicle and of an equivalence factor associated with the traction battery.

7. The control method according to claim 3, also comprising, before the step of analytically calculating the optimal supply voltage, a step of determining the electrical power supplied by the traction battery.

8. The control method according to claim 2, wherein the mathematical expression of said optimal supply voltage is selected equal to the maximum voltage threshold if the expression $$\frac{-K_2}{2\cdot K_2}$$

is greater than said maximum voltage threshold.

9. The control method according to claim 8, wherein the power supplied by the traction battery is expressed according to the formula: $P_{bat}=K_2U_e^2+K_1U_e+K_0$, where $U_e$ is the supply voltage and $K_0$, $K_1$ and $K_2$ are predetermined functions depending on the first speed of the first electrical machine, on the second speed of the second electrical machine, on the first electric torque developed by the first electrical machine and on the second electric torque developed by the second electrical machine.

10. The control method according to claim 8, also comprising, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the hybrid electric vehicle and of an equivalence factor associated with the traction battery.

11. The control method according to claim 8, also comprising, before the step of analytically calculating the optimal supply voltage, a step of determining the electrical power supplied by the traction battery.

12. The control method according to claim 2, wherein the power supplied by the traction battery is expressed according to the formula: $P_{bat}=K_2U_e^2+K_1U_e+K_0$, where $U_e$ is the supply voltage and $K_0$, $K_1$ and $K_2$ are predetermined functions depending on the first speed of the first electrical machine, on the second speed of the second electrical machine, on the first electric torque developed by the first electrical machine and on the second electric torque developed by the second electrical machine.

13. The control method according to claim 2, also comprising, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the hybrid electric vehicle and of an equivalence factor associated with the traction battery.

14. The control method according to claim 2, also comprising, before the step of analytically calculating the optimal supply voltage, a step of determining the electrical power supplied by the traction battery.

15. The control method according to claim 1, wherein the power supplied by the traction battery is expressed according to the formula: $P_{bat}=K_2U_e^2+K_1U_e+K_0$, where $U_e$ is the supply voltage and $K_0$, $K_1$ and $K_2$ are predetermined functions depending on the first speed of the first electrical machine, on the second speed of the second electrical machine, on the first electric torque developed by the first electrical machine and on the second electric torque developed by the second electrical machine.

16. The control method according to claim 15, also comprising, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the hybrid electric vehicle and of an equivalence factor associated with the traction battery.

17. The control method according to claim 1, also comprising, before the step of analytically calculating the optimal supply voltage, a step of determining a first optimal electric torque that the first electrical machine must develop and a second optimal electric torque that the second electrical machine must develop, the first optimal electric torque and the second optimal electric torque being a function of a value of energy required to propel the hybrid electric vehicle and of an equivalence factor associated with the traction battery.

18. The control method according to claim 17, wherein said first optimal electric torque, said second optimal electric torque and said optimal electrical voltage minimize the electrical losses in an assembly comprising at least the voltage modulation device if a Hamiltonian, which is a function of a fuel consumption of the internal combustion engine of the hybrid electric vehicle and of an electric current consumption of said assembly, is minimized.

19. The control method according to claim 1, also comprising, before the step of analytically calculating the optimal supply voltage, a step of determining the electrical power supplied by the traction battery.

20. The control method according to claim 1, wherein the electrical losses in the voltage modulation device are expressed in the form of a linear function of said supply voltage.

* * * * *

UNITED STATES PATENT AND TRADEMARK OFFICE
CERTIFICATE OF CORRECTION

PATENT NO. : 12,065,124 B2
APPLICATION NO. : 17/260777
DATED : August 20, 2024
INVENTOR(S) : Guillaume Colin, Souad Hadj-Said and Ahmed Ketfi-Cherif It is certified that error appears in the above-identified patent and that said Letters Patent is hereby corrected as shown below:

In the Specification

In Column 6, Lines 47-61, should read as follows:

--For this purpose, the calculator 50 calculates an intermediate voltage of the form $\frac{-K_1}{2 \cdot K_2}$, wherein $K_1$ and $K_2$ are predetermined functions. These predetermined functions depend on the first speed $\omega_{e1}$ of the first electrical machine 36a, on the second speed $\omega_{e2}$ of the second electrical machine 36b, on the first electric torque $T_{e1}$ developed by the first electrical machine 36a and on the second electric torque $T_{e2}$ developed by the second electrical machine 36b. They depend in particular on the first current electric torque $T_{e1}^c$ of the first electrical machine 36a and on the second current electric torque $T_{e2}^c$ of the second electrical machine 36b. In practice, these functions $K_1$ and $K_2$ are determined upstream based on experimental results. The functions $K_1$ and $K_2$ are then stored in the memory of the calculator 50.--.

In Column 8, Lines 22-25, should read as follows:
--The first part consists in optimizing the supply voltage $U_e$. Using the Hamiltonian defined above, the optimal supply voltage $U_e^{opt}$ is therefore the solution of the equation:
$U_e^{opt} = \arg \min_{U_e} H_{hyb}$ .--.

In Column 10, Lines 44-48, as follows:
--The optimization of the electrical power supply $P_{elec}$ then results in the determination of the first optimal electromechanical power $P_{m1}^{opt}$ as a function of the electromechanical power $P_m$ by the following formula:
$P_{m1}^{opt} = \arg \min_{P_{m1}} P_{elec}(P_m, P_{m1})$ or else $\frac{\partial P_{elec}}{\partial P_{m1}} = 0$ .--.

Signed and Sealed this
First Day of October, 2024

*Katherine Kelly Vidal*

Katherine Kelly Vidal
*Director of the United States Patent and Trademark Office*